UNITED STATES PATENT OFFICE.

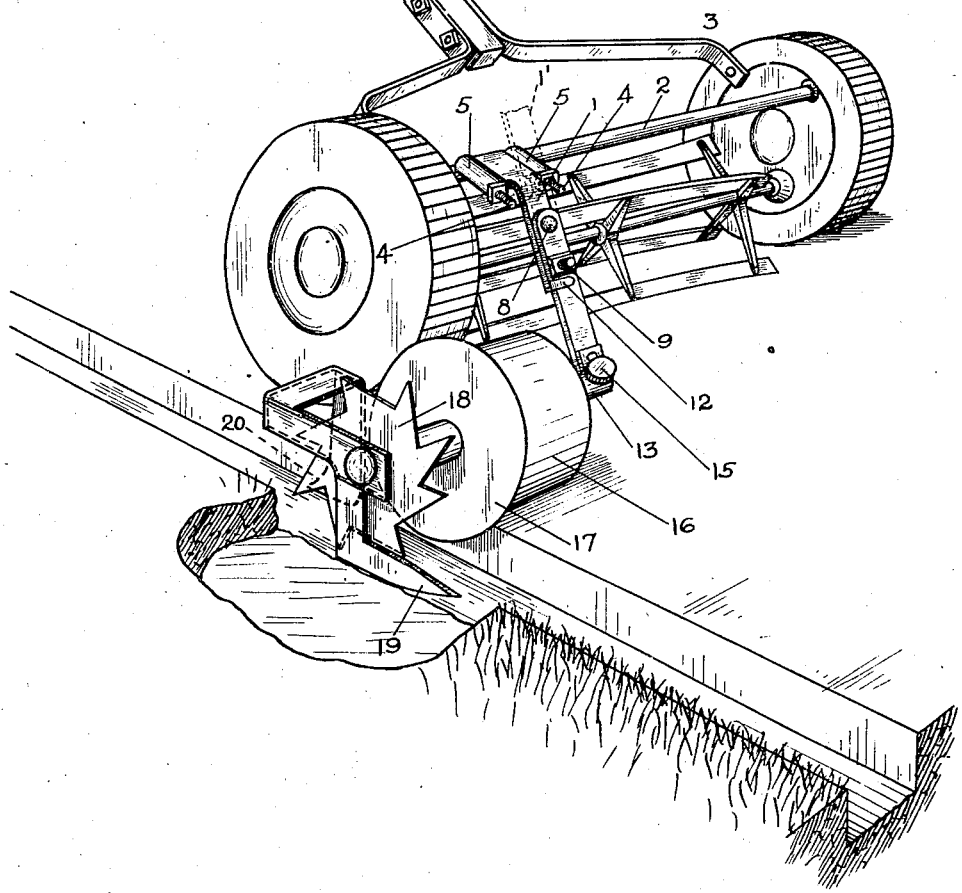

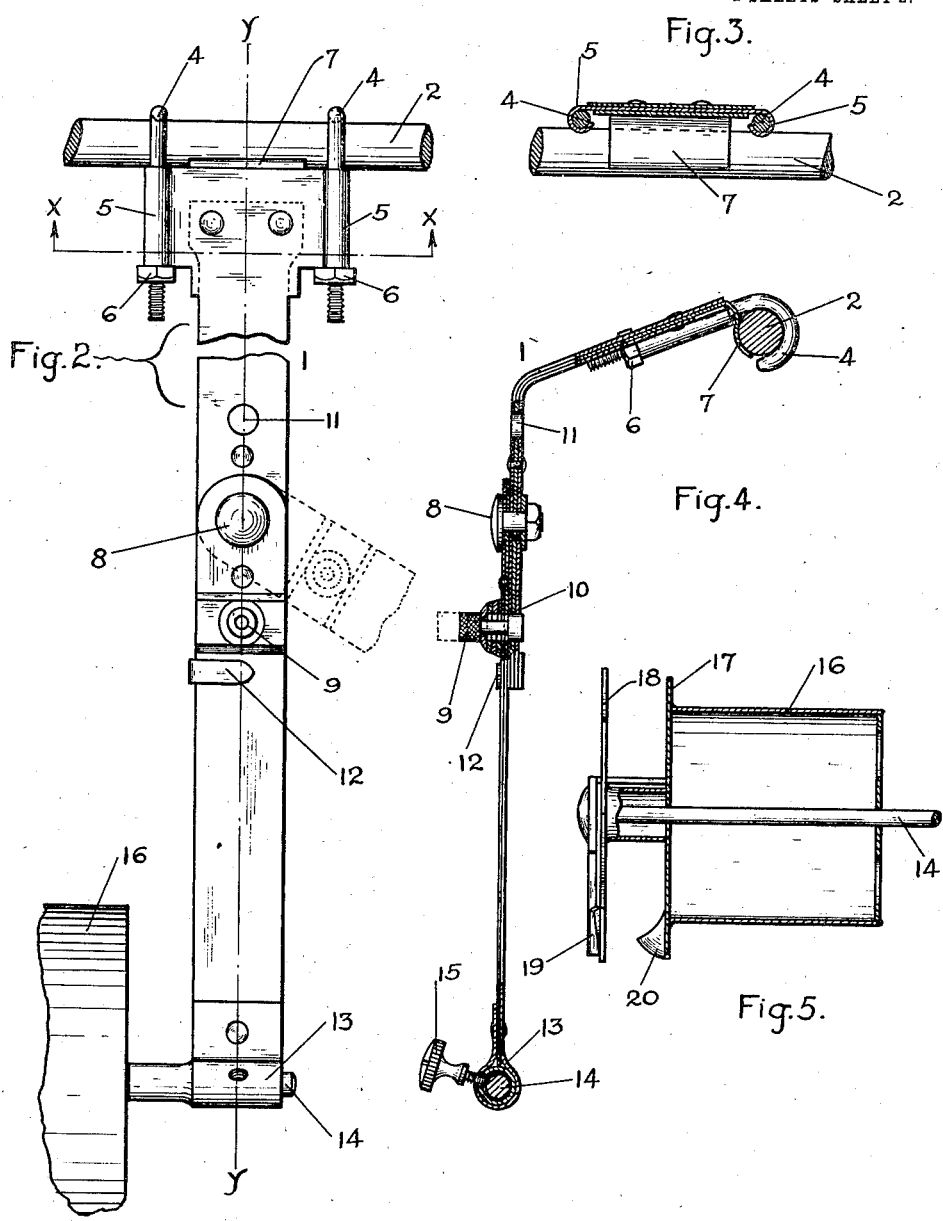
E. JANSON.
LAWN MOWER ATTACHMENT.
APPLICATION FILED JULY 25, 1912.
1,065,946.
Patented July 1, 1913.
2 SHEETS—SHEET 2.

EMIL JANSON, OF TERRE HAUTE, INDIANA.

LAWN-MOWER ATTACHMENT.

1,065,946.   Specification of Letters Patent.   Patented July 1, 1913.

Application filed July 25, 1912. Serial No. 711,563.

*To all whom it may concern:*

Be it known that I, EMIL JANSON, a citizen of the United States, and a resident of the city of Terre Haute, county of Vigo, and State of Indiana, have invented certain new and useful Improvements in Lawn-Mower Attachments, of which the following is a specification.

My invention relates to lawn mower attachments and more specifically to that class thereof designed for use in cutting the edge of a lawn at the groove or trench which is usually provided in a lawn adjacent the edge of a sidewalk or the like.

In the mowing of a lawn which is provided with a groove or trench at its edge, the blades of grass adjacent the groove, as the same are severed, drop into the groove where the same, because of their inaccessibility, are permitted to remain, resulting in an untidy and unfinished appearance since the groove or trench at the edge of the lawn, in order to finish the latter should appear jet black.

It is the object of my invention to provide an attachment for a lawn mower through the medium of which the grass bordering upon the groove at the edge of the lawn may be readily cut and the groove itself maintained apparently free from severed grass blades.

A further object is the production of an attachment as mentioned which will be durable and economical in construction, and efficient in operation.

Other objects will appear hereinafter.

The invention consists in the combinations and arrangements of parts hereinafter described and claimed.

The invention will be best understood by reference to the accompanying drawings forming a part of this specification, and in which, Figure 1 is a perspective view of a conventional lawn mower to which is applied an attachment embodying my invention, Fig. 2 is an enlarged substantially front elevation of the supporting arm included in the attachment, Figs. 3 and 4 are sections taken on substantially lines *x—x* and *y—y* respectively of Fig. 2, and Fig. 5 is a sectional detail of the drum which is included in the construction.

The preferred form of construction as illustrated in the drawings comprises a supporting arm 1 which is adapted to be detachably clamped to one of the rigid frame bars 2 of a conventional mower which is indicated at 3. The means of attaching arm 1 to the bar 2 comprises hook members 4 which are adapted to embrace the bar 2, the shanks of members 4 engaging loops 5 provided at the opposite sides of the rearward end of arm 1, nuts 6 threaded upon said shanks and which engage against the forward extremity of the loops 5 serving as a means of holding members 4 in clamping relation with bar 2, as will be readily understood. The arm 1 is of jointed construction, the lower end portion thereof being pivotally secured at 8 to the upper end portion so as to permit of said lower end portion being swung upwardly as shown in dotted lines in Fig. 1, to inoperative position when the attachment is not in use. The lower end portion of arm 1 is locked in operative or inoperative position by means of a movable pin 9 which is adapted to engage an opening 10 provided in the lower end of the upper portion of said supporting arm to lock the former in operative position, said pin being adapted to engage perforation 11 provided in said upper portion of said supporting arm to lock the former in elevated or inoperative position. A stop 12 is provided against which the lower end portion of arm 1 is adapted to abut in order to position the same to effect registration of pin 9 with opening 10.

The lower end of supporting arm 1 is formed with a tubular bearing portion 13 for supporting one end of a laterally projecting spindle 14, the latter being secured in the portion 13 by means of set screw 15 which evidently permits of rotatable adjustment of said spindle. Rotatably mounted upon the outer end of spindle 14 is a drum 16, which, when the device is in use, is adapted to contact with the ground and to rotate by frictional engagement therewith. The outer extremity of drum 16 is provided with an outwardly projecting circumferential flange 17, which is adapted to engage against the edge of the sidewalk or like upon which the lawn mower is traveling, and serve as a gage to maintain the device in operative proximity with the walk edge and hence with the lawn groove or trench which extends along the walk as clearly shown in Fig. 1. Fixed to the outer end of drum 16 in spaced relation with flange 17 is a circular toothed cutter member 18, the teeth of which, when rotated, are adapted to coöperate with the stationary cutter member 19 to effect the cutting of the grass blades bordering upon the lawn groove, stationary cutter member 19 being so positioned that, when the device is in use, the same will travel in close proximity with the edge of the groove at the lawn side.

Arranged rearwardly of gage flange 17 and co-planar therewith is an inwardly curved plow 20 which is adapted, when the device is in use, to pierce the bottom of the lawn groove adjacent the sidewalk and turn the ground over so as to bury the blades of grass which have been severed by the cutting members 18 and 19 and which have fallen into the groove. The members 19 and 20 are rigidly secured to the outer end of spindle 14 so that adjustment thereof in order to properly position the same may be effected by simply loosening the set screw 15 and adjusting said shaft 14.

A device of the construction set forth is simple and economical in construction, the same may be readily manipulated and through the employment thereof the groove at the edge of a lawn may be maintained in proper condition.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention what I claim as new and desire to secure by Letters Patent is:

1. An attachment for an ordinary lawn mower for trimming the edge of a lawn and comprising a supporting member adapted to be secured to said mower; a drum rotatably mounted upon said supporting member; a rotatable toothed cutter supported by said supporting member arranged adjacent said drum; and a stationary cutter member supported by said supporting member arranged for coöperation with said rotatable toothed cutter in the cutting operation, substantially as described.

2. An attachment for an ordinary lawn mower for trimming the edge of a lawn and comprising a supporting member adapted to be secured to said mower; a drum rotatably mounted upon said supporting member; a rotatable toothed cutter supported by said supporting member arranged adjacent said drum; a stationary cutter member supported by said supporting member arranged for coöperation with said rotatable toothed cutter in the cutting operation; and a plow supported by said supporting member adapted, in the operation of the device, to turn over the soil to bury the blades of grass severed by said cutter members, substantially as described.

3. In a device of the class described, the combination of a rotatable drum; an annular gage flange at one end of said drum; a rotatable toothed cutter spaced from said end of said drum; a stationary cutter member arranged for coöperation with said rotatable toothed cutter in the cutting operation; and a plow arranged co-planer with said gage flange for turning over the soil to bury the blades of grass severed by said cutter members, substantially as described.

4. An attachment for a lawn mower comprising a supporting arm adapted to be detachably clamped to said mower; a laterally projecting spindle carried by said arm; a drum rotatably mounted upon said spindle; a tubular cutter member rotatably mounted upon said spindle and spaced slightly from the adjacent end of said drum; a stationary cutter member arranged for coöperation with said rotatable toothed cutter in the cutting operation; and a plow adapted, during the operation of the device, to turn over the soil to bury the blades of grass severed by said cutter members, substantially as described.

5. An attachment for a lawn mower, comprising a jointed supporting arm permitting of the outer end thereof being swung to inoperative position; means for locking said arms in either operative or inoperative positions; a laterally projecting spindle carried by said arm; a drum rotatably mounted upon said spindle; a toothed cutter member rotatably mounted upon said spindle and spaced slightly from the adjacent end of said drum; a stationary cutter member arranged for coöperation with said rotatable toothed cutter in the cutting operation; and a plow adapted, during the operation of the device, to turn over the soil to bury the blades of grass severed by said cutter members, substantially as described.

6. A lawn mower attachment comprising a supporting arm adapted to be detachably clamped to said mower; a non-rotatable laterally projecting spindle carried by and rotatably adjustable in said supporting arm; a drum rotatably mounted upon said spindle; an outwardly projecting annular gage flange at the outer end of said drum; a toothed cutter member rotatably mounted upon said spindle and spaced slightly from said outer end of said drum; a stationary cutter member fixed to said spindle arranged for coöperation with said rotatable toothed cutter in the cutting operation; and a plow fixed to said spindle and arranged substantially co-planer with said gage flange adapted, in the operation of the device, to turn over the soil to bury the blades of grass severed by said cutter members, substantially as described.

In testimony whereof I have signed my name to this specification in the presence of two subscribing witnesses.

EMIL JANSON.

Witnesses:
WALTER D. NISBET,
ROBERT W. NICHOLSON.